(12) United States Patent
Kauff et al.

(10) Patent No.: US 9,462,184 B2
(45) Date of Patent: Oct. 4, 2016

(54) CAPTURING PANORAMIC OR SEMI-PANORAMIC 3D SCENES

(71) Applicant: FRAUNHOFER-GESELLSCHAFT ZUR FOERDERUNG DER ANGEWANDTEN FORSCHUNG E.V., Munich (DE)

(72) Inventors: Peter Kauff, Berlin (DE); Peter Eisert, Berlin (DE); Joachim Schuessler, Berlin (DE); Christian Weissig, Berlin (DE); Arne Finn, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 355 days.

(21) Appl. No.: 14/049,057

(22) Filed: Oct. 8, 2013

(65) Prior Publication Data

US 2014/0104378 A1    Apr. 17, 2014

Related U.S. Application Data

(63) Continuation of application No. PCT/EP2012/050190, filed on Jan. 6, 2012.

(60) Provisional application No. 61/473,595, filed on Apr. 8, 2011.

(51) Int. Cl.
*H04N 7/00* (2011.01)
*H04N 5/232* (2006.01)
(Continued)

(52) U.S. Cl.
CPC .......... *H04N 5/23238* (2013.01); *G02B 13/06* (2013.01); *G02B 27/1066* (2013.01);
(Continued)

(58) Field of Classification Search
CPC .... H04N 5/23238; H04N 7/005; H04N 3/30; G03B 37/04; G06T 3/0018
USPC ......................................................... 348/38
See application file for complete search history.

(56) References Cited

U.S. PATENT DOCUMENTS 3,505,465 A    4/1970  Rees
7,429,997 B2 *  9/2008  Givon .................... G03B 35/00
                                                              348/38
(Continued)

FOREIGN PATENT DOCUMENTS

CA          673633        11/1963
JP     2011-095344 A       4/1999
WO     WO-98/47291       10/1998

OTHER PUBLICATIONS

Point Grey; retrieved online from url: ptgrey.com, unknown, 2 pages.

(Continued)

*Primary Examiner* — Mehrdad Dastouri
*Assistant Examiner* — Kristin Dobbs
(74) *Attorney, Agent, or Firm* — Michael A. Glenn; Perkins Coie LLP

(57) ABSTRACT

A provision of high quality panoramic or semi-panoramic 3D scenes is achieved at reasonable efforts by arranging the plurality of camera pairs, each of which is associated with a respective one of mirror plane surfaces of a pyramid or clipped-pyramid shaped mirror in that same is directed towards the respective associated mirror plane surface, such that for each camera pair the virtual positions of pivot points of the cameras of the respective camera pair are offset from each other along a straight baseline which, in turn, is offset from the axis of the mirror, and a distance between virtual points of a left-hand channel camera of a first camera pair associated with a first mirror plane surface and a right-hand channel camera of a second camera pair associated with a second mirror plane surface positioned neighboring the first mirror plane surface, deviates from a length of the baselines of the camera pairs by less than 10% of the length of the baselines.

20 Claims, 16 Drawing Sheets

(51) Int. Cl.
| | |
|---|---|
| H04N 5/247 | (2006.01) |
| H04N 13/02 | (2006.01) |
| G02B 13/06 | (2006.01) |
| G02B 27/10 | (2006.01) |
| G02B 27/14 | (2006.01) |
| H04N 5/262 | (2006.01) |
| G06T 3/00 | (2006.01) |
| G03B 35/08 | (2006.01) |
| G03B 37/04 | (2006.01) |

(52) U.S. Cl.
CPC ............. *G02B27/143* (2013.01); *G03B 35/08* (2013.01); *G03B 37/04* (2013.01); *G06T 3/0062* (2013.01); *H04N 5/247* (2013.01); *H04N 5/2628* (2013.01); *H04N 13/0242* (2013.01)

(56) References Cited

U.S. PATENT DOCUMENTS

| | | | |
|---|---|---|---|
| 2005/0117015 A1* | 6/2005 | Cutler | H04N 5/2254 348/38 |
| 2007/0014347 A1* | 1/2007 | Prechtl | H04N 5/232 375/240.01 |
| 2014/0118488 A1* | 5/2014 | Steuart, III | G03B 35/08 348/38 |
| 2014/0300692 A1* | 10/2014 | Lablans | G03B 37/00 348/38 |

OTHER PUBLICATIONS

"Dodeca 2360 Camera System", Immersive Media; retrieved online from url: http://www.simdigital.com/resources/Camera/Dodeca%202360%20-%20Product%20Sheet.pdf, May 2011, 2 pages.

"FC-1005 Camera & FC-110 Camera", Full View; retrieved online from url: http://www.fullview.com/products.html, unknown, 3 pages.

"GeoView-3000-LB3", iMove Inc.; retrieved online from url: www.imoveinc.com/geoview.php, unknown, 2 pages.

"OmniAlert 360", Remote Reality; retrieved online from url: https://web.archive.org/web/20120711185413/http://www.remotereality.com/omnialert360-productsmenu-121, unknown, 2 pages.

"Seattle Cinerama Grand Reopening", HPC Market Watch, retrieved online from url: http://markets.financialcontent.com/stocks/news/read?ChannelID=3197&GUID=15456683, Nov. 5, 2010, 3 pages.

"The Elbe Dome: Immerse in Virtual Worlds", VDTC 2011, retrieved from url: www.vdtc.de/allg/elbe-dom-eng-fraunhofer-iff.pdf, Nov. 2011, 2 pages "Mega Vision's Solution", MegaVision; retrieved online from url: http://www.megavision.co.jp/eng/solution/index.html, Oct. 2004, 3 pages.

"TiME Lab", retrieved from url: http://www.timelab-hhi.com/index.php?option=com_content&view=featured&Itemid=215&lang=en, Feb. 2010, 3 pages.

Baker, S. et al., "A Theory of Single-viewpoint Catadioptric Image Formation", Int'l Journal of Computer Vision, vol. 35, No. 2, Nov. 1999, pp. 175-196.

Bimber, O. , "Multi-Projector Techniques for Real-Time Visualizations in Everyday Environments", Proc. IEEE Virtual Reality Conference, Workshop on Emerging Display Technologies, Mar. 2006, p. 33.

Chai, Jin-Xiang et al., "Plenoptic Sampling", Proc. SIGGRAPH 2000; New Orleans, Louisiana, Jul. 2000, 12 pages.

Gotz, David , "The Design and Implementation of PixelFlex: A Reconfigurable Multi-Projector Display System", Technical Report, Univ. of North Carolina, Chapel Hill, U.S., 2001, 8 pages.

Kawanishi, et al., "Generation of high-resolution stereo panoramic images by omnidirectional imaging sensor using hexagonal pyramidal mirrors", Proceedings of the 14th Int'l Conf. on Pattern Recognition; vol. 1; Brisbane, Australia, Jan. 1998, pp. 485-489.

Lantz, Ed , "A Survey of Large-Scale Immersive Displays", ACM SIGGRAPH in the Emerging Display Technology Conference Proceedings, Aug. 2007, 7 pages.

Li, K. et al., "Optical Blending for Multi-Projector Display Wall Systems", IEEE Proc. 12th Laser and Electro-Optics Society, vol. 1, Nov. 1999, pp. 281-282.

Majumder, A. et al., "Immersive Teleconferencing: A New Algorithm to Generate Seamless Panoramic Video Imagery", Proc. of the 7th ACM Int'l Conf. on Multimedia; Orlando, Florida, Oct. 1999, pp. 169-178.

Majumder, A. , "Perceptual Photometric Seamlessness in Projection-Based Tiled Displays", ACM Transactions on Graphics, vol. 2, No. 3, Sep. 2001, pp. 111-134.

Peleg, Shmuel et al., "Omnistereo: Panoramic Stereo Imaging", IEEE Transactions on Pattern Analysis and Machine Intelligence, vol. 23, No. 3, Mar. 2001, pp. 279-290.

Schuessler, et al., "3D Omni-Cam—The Ultimate Solution for Capturing Panoramic 3D Live-Content with Highest Quality", U.S. Appl. No. 61/473,595, Apr. 2011, pp. 1-9.

Shum, Heung-Yeung et al., "Rendering with Concentric Mosaics", Proc. SIGGRAPH, Los Angeles, California, Aug. 1999, 8 pages.

Sturm, Peter et al., "Camera Models and Fundamental Concepts Used in Geometric Computer Vision", Foundations and Trends in Computer Graphics and Vision, vol. 6, Nos. 1-2, Jan. 2011, pp. 1-183.

Tan, Kar-Han et al., "Multiview Panoramic Cameras Using a Mirror Pyramid", Proceedings of the Third Workshop on Omnidirectional Vision; Piscataway, NJ, USA, Jun. 2, 2002, pp. 87-93.

Wang, Chiao et al., "Region-Based Stereo Panorama Disparity Adjusting", 2006 IEEE 8th Workshop on Multimedia Signal Processing; Victoria, Canada, Oct. 1, 2006, pp. 186-191.

Weissig, C. et al., "A Modular High-Resolution Multi-Projection System", Proc. 2nd Workshop on Immersive Communication and Broadcast Systems; Berlin, Germany, Oct. 2005, 4 pages.

Wolfley, Bob , "ESPN offers a closer view with Maxx Zoom technology", Journal Sentinel; retrieved online from url: www.jsonline.com/sports/103677489.html, Sep. 23, 2010, 8 pages.

* cited by examiner

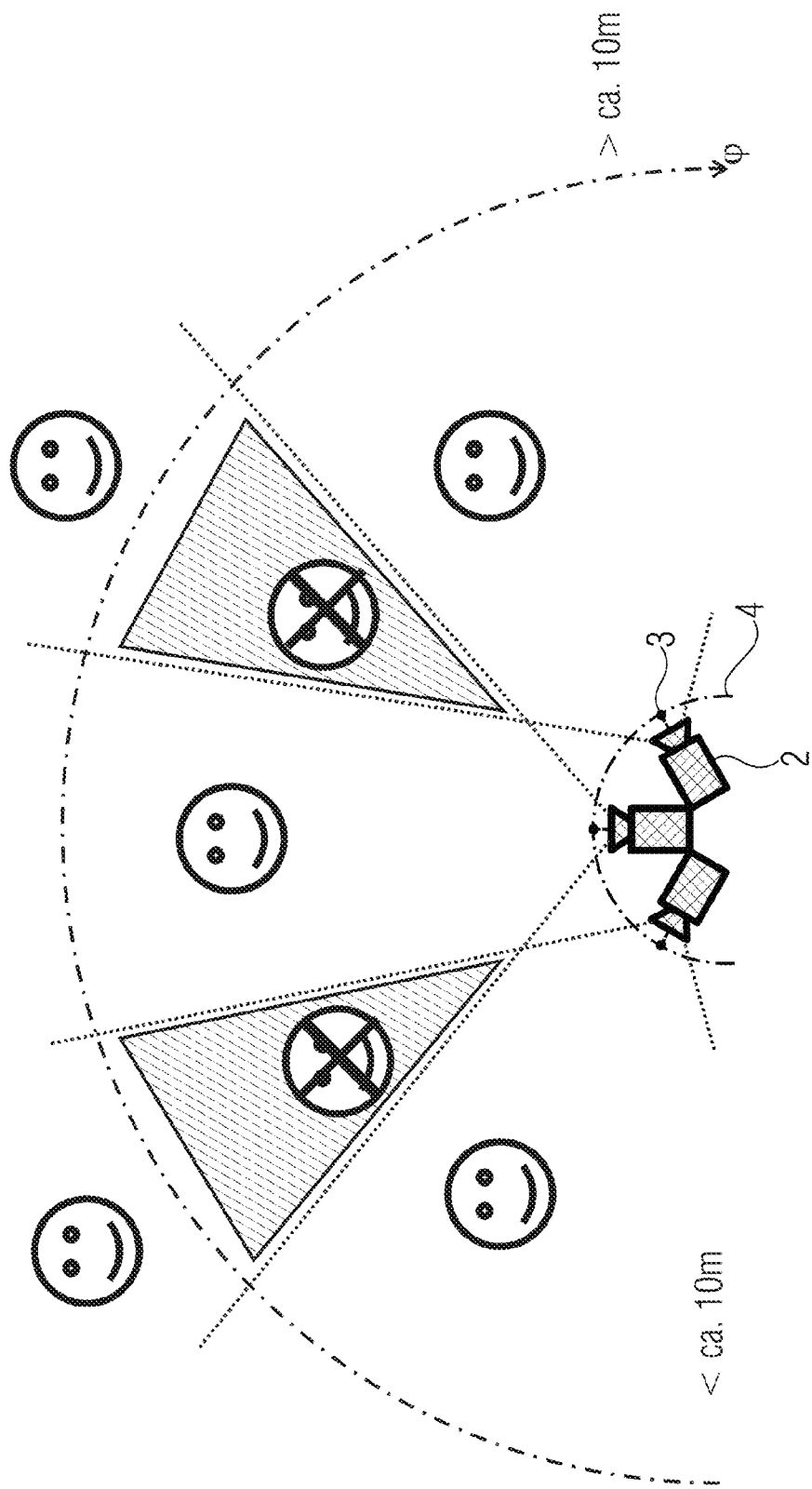

stereo content from same mirror segment stereo content from crossed mirror segment

CAPTURING PANORAMIC OR SEMI-PANORAMIC 3D SCENES

CROSS-REFERENCE TO RELATED APPLICATIONS

This application is a continuation of copending International Application No. PCT/EP2012/050190, filed Jan. 6, 2012, which is incorporated herein by reference in its entirety, and additionally claims priority from U.S. Provisional Application No. 61/473,595, filed Apr. 8, 2011, which is also incorporated herein by reference in its entirety.

BACKGROUND OF THE INVENTION

The present application relates to panoramic or semi-panoramic 3D scenes and their capturing.

It is widely accepted that concept of immersive media is one of the most promising market segments of future technology. One feature of immersive media is panoramic imaging using large cylindrically or spherically curved screens, often in combination with multi-projection systems providing ultra-high resolution by exact juxtaposition and blending of multiple projector images[1][2][3][4][5]. Being lost in niche markets like theme parks for a long time, these applications are now migrating into new market segments like event and exhibition technology, training centers or even entertainment. Typical applications are dome projections (e.g. in planetariums), giant screen cinemas (e.g. re-opening of digital Cinerama theatres) or immersive 180° or 360° surround video (e.g. simulation and training centers) [6][7][8]. In future, they may even address immersive viewing in new types of cinema theatres or other public venues, or, to its end, in immersive home entertainment.

In February 2010, the Fraunhofer Heinrich-Hertz-Institute (HHI) in Berlin, Germany, has opened its 'Tomorrow's Immersive Media Experience Laboratory (TiME Lab)', an experimental platform for immersive media and related content creation. The TiME Lab uses up to 14 HD projectors for panoramic 2D and 3D projection at a cylindrical 180° screen with a resolution of 7 k×2 k as well as a 'Wave Field Synthesis (WFS)' sound system with 128 loudspeakers [9].

Apart from multi-projection, a further main challenge of panoramic imaging is to create live footage supporting these special video formats in combination with ultra-high resolution. One solution is, in analogy to multi-projection, to use multiple cameras where the single cameras look into different directions such the resulting images can be stitched seamlessly to large panoramic views. The technology of such omni-directional camera systems has a long tradition. First systems that use multiple cameras and mirrors to achieve full surround capture with high image resolution have already been used in the 60s by Ub Iwerks for Disney theme park productions [10]. Since then many further mirror-based system approaches have been proposed (e.g. [11]). Other approaches place a hyperboloid mirror in front of a single camera to capture panoramic views [12][13]. Today, the advances and ongoing miniaturization of digital video cameras enables more compact systems and several commercial companies offer omni-directional cameras for a wide range of applications [14][15][16][17][18][19][20][21]. Good overviews about different approaches on panoramic imaging are given in [22][23].

The term "3D panoramic video" is often used for 360° viewing capability in a 2D panorama. However, in this context, two video panoramas of the same scene but with different perspective are considered, one for the left and one for the right eye in order to allow stereoscopic 3D. Although the concept of omni-directional cameras for capturing 2D video panoramas is well understood and a lot of efficient systems are already available, capturing of 3D video panoramas is still a challenge and a partly unsolved problem.

In the following, some review of omni-directional imaging and panoramic 2D video is provided.

As known from projective geometry, the optimal multi-camera arrangement for capturing panoramic videos necessitates that the focal points of all camera views or cameras 2 coincide in a common point 1 (see FIG. 1A) [22][23]. In case of capturing static 2D panoramas, this condition is usually achieved by rotating a single camera at a tripod with a revolving camera head. For video, however, this approach is impractical due to the need of using multiple cameras on one hand and the physical dimensions of each camera on the other hand. Hence, special mirror rigs are often used to achieve the condition from FIG. 1A. A related mirror rig for implementing the arrangement of FIG. 1A is shown in FIG. 1B. To avoid mechanical complexity, many commercial solutions, however, capture video panoramas with the star-like approach from FIG. 1C, an implementation of which is shown in FIG. 1D[18][21]. In this case the focal points 3 of all cameras 2 are located on a common circle 4, while the optical axes 5 are perpendicular to the arc 4. This approach works reasonably well as long as only far distant objects appear in the scene. However, the existence of a non-zero parallax angle does not allow seamless stitching in case of close objects in the overlap area (see FIG. 1E).

As said, a suitable approximation of the optimal solution from FIG. 1A can be achieved by using special mirror-rigs as exemplarily shown in FIG. 1B. If all cameras 2 and mirrors 6 are arranged correctly, it is possible to superimpose the virtual images of all focal points in one common central point 1 behind the mirrors 6. Since the first applications in the 60s, many further system approaches have been proposed and have made a lot of progress, last but not least, due to the advent of digital TV and cinema cameras [10][22][23].

In particular, an advanced version of the system shown in FIG. 1B has recently been presented by Fraunhofer HHI. The so-called OMNICAM is a scalable system, which can be equipped with up to 12 HD cameras for 360° shooting. In its implementation shown FIG. 1B, it uses 6 HD cameras 2 suitable to shoot 180° panoramas. The six cameras 2 generate tiles of 1080×1920 pixels each, which can subsequently be stitched to one large panorama with a final resolution of 6984×1920 for 180°. As the cameras 2 are used in portrait format, the vertical field-of-view is about 60°, a feature that is extremely useful for immersive media.

A special property of the OMNICAM of FIG. 1B is its very accurate calibration capabilities shown in FIGS. 2A and 2B. This illustration depicts a horizontal section through the mirror pyramid 6 at the plane where the optical axes 5 intersect the mirror surfaces 6 and, with it, how the virtual images 7 of the focal points are located behind the mirrors 6. Note that the cameras look from bottom upwards and that the mirrors 6 deflect the optical axes horizontally in radial direction (see also FIG. 1B).

In a first step the rig is calibrated such that all virtual images 7 of the focal points coincide in the centre C of the mirror pyramid (see FIG. 2A). This initial state refers to the optimal camera arrangement from FIG. 1A. It is obtained by very precise optical measurements in the laboratory or by a special calibration process on set.

Although this initial and optimal state allows a parallax-free stitching for scenes with a depth range from zero to infinity, it is not really suitable under real working conditions. If all cameras 2 have a common focal point in the center C of the mirror pyramid 6, there would be no overlap between the different tiles due to a hard cut at the mirror edges 8. Hence, there is no possibility to blend pixels between adjacent image tiles. In former applications like theme park productions this drawback has been concealed by segmented projection screens.

However, this is not acceptable any longer for seamless projection of video panoramas in future immersive media applications. Hence, at least some slight overlap between adjacent image tiles is needed. In order to obtain overlaps, the virtual image portion 7 of the focal points of the cameras have to be moved symmetrically by precise actuators out of the center C in radial direction (FIG. 2B). By this off-center adjustment of the focal points, it becomes possible to regulate a scene-adaptive trade-off between sufficient overlaps for blending and parallax-free stitching, an outstanding feature that is not provided by other omni-directional camera systems that are available at the market. In practice, the OMNICAM is usually operated with a radial-shift of about 5 mm, resulting in a blending area of about 10 pixels and a parallax-free stitching of scenes with a depth range from 2 m to infinity. FIGS. 3A to 3D shows an example of intermediate and final results of consecutive steps of a whole OMNICAM processing for a sports production. FIG. 3A) shows the original camera views arranged side by side in their order along the lateral angle direction; FIG. 3B) shows the views after a geometrical correction and warping; FIG. 3C) shows the views after photometrical correction, color matching and blending, i.e. stitched together; and FIG. 3D) shows in a final cut-out of panoramic view created by cropping the views having been stitched together.

Next, possible extensions to Omni-Stereo Imaging and Panoramic 3D video and the problems involved therewith are discussed.

In principle, the above considerations can also be extended towards omni-directional recording of 3D panoramas. However, in the 3D case the situation is much more sophisticated. The main challenge is to solve a fundamental conflict between two competing requirements. On one hand, as in 2D, panoramic 3D imaging also necessitates a parallax-free stitching of the left- and right-eye panoramas. On the other hand, significant parallaxes are needed between the two stereo panoramas to obtain an adequate stereo impression.

Known solutions from literature that solve this problem are mainly suited for static scenes. The capture of static omni-stereo panoramas has already been investigated since more than 15 years. A nice overview on the major principles can be found in [24]. As already mentioned in the previous section, the optimal solution for static 2D panoramas is to rotate a single camera around its focal point (see FIG. 4A). As shown in FIG. 4B, the straight forward extension to 3D is a rotation of a stereo camera 2' around the center 9 of its baseline B.

From literature, this concept is also known as concentric mosaics, a special version of the plenoptic function [25]. Unfortunately, it is not that easy to apply this solution to the acquisition of 3D video panoramas, especially not for the star-like approach from FIG. 1C. FIG. 5 shows a corresponding star-like arrangement for stereo cameras. As it can be seen from this drawing, the inter-axial distance B of one stereo sub-system is much smaller than the inter-axial distance S between adjacent panorama cameras of same stereo channel (either left-eye or right-eye). This situation perfectly explains the above mentioned conflict between unwanted parallax errors for the stitching process and the necessitated parallax for stereo reproduction. Imagine that the stereo baseline B is well adapted to the near and far objects in the scene such that the resulting parallaxes between the left and right views produce a clearly visible and comfortable stereo effect. Hence, as the inter-axial distance S between adjacent left-eye (or right-eye) panorama cameras is in any case larger than B (or in best case equal to B), the parallax error that appears while stitching the left- and right-eye panoramas is larger than (or equal to) the stereo parallax, if the same near and far objects are also present in the overlap area. Or in other words, if one wants to avoid visible parallax errors while stitching, the stereo effect is lost. The only situation where it works is given by a scene that has enough depth in the single stereo segments but remains flat in the stitching areas. Obviously, such a situation is difficult to control under real shooting conditions.

The optimal solution from FIG. 4B is even more difficult to achieve with real video cameras. The concept of concentric mosaics necessitates that the stereo camera 2' is rotated in very small angular increments respecting the plenoptic sampling theorem [26]. In the extreme case, the stereo rig even consists of vertical line cameras only and the rotation scans the stereo panorama column by column. Hence, in case of stereo panoramas with ultra-high resolution of several thousand pixels, the angular increment is significantly lower than one degree. It is self-evident that such a set-up cannot be realized with multiple video cameras for 3D video content.

Thus, it is an objective of the present invention to provide a scheme for capturing panoramic or semi-panoramic 3D scenes, which is able to provide high quality 3D scene results at reasonable efforts.

SUMMARY

According to an embodiment, an apparatus for capturing panoramic or semi-panoramic 3D scenes may have: a mirror having a mirror surface composed of mirror plane surfaces, arranged like sides of a pyramid or clipped-pyramid with a polygonal base and an axis; a plurality of camera pairs each of which is associated with a respective one of the mirror plane surfaces and directed towards the respective associated mirror plane surface, so that the plurality of camera pairs look into substantially radial directions via the respective associated mirror plane surface, wherein, for each camera pair, virtual positions of pivot points of the cameras of the respective camera pair are offset from each other along a straight baseline which is offset from the axis, and a distance between virtual points of a left-hand channel camera of a first camera pair associated with a first mirror plane surface and a right-hand channel camera of a second camera pair associated with a second mirror plane surface positioned neighboring the first mirror plane surface deviates from a length of the baselines of the camera pairs by less than 10% of the length of the baselines, wherein center points of the baselines of all stereo camera pairs lie on a circle with radius d around axis within a deviation of 10% of d, and the length of the baselines varies within 10% of a mean baseline length B with $$d = -\frac{B}{2}\frac{\sin(\alpha)}{(1-\cos(\alpha))} + \frac{B}{2}\sqrt{\frac{2}{1-\cos(\alpha)}}$$

wherein α is the angular aperture of the mirror plane surfaces.

Another embodiment may have a method for capturing panoramic or semi-panoramic 3D scenes using a mirror having a mirror surface composed of mirror plane surfaces, arranged like sides of a pyramid or clipped-pyramid with a polygonal base and an axis, and a plurality of camera pairs each of which is associated with a respective one of the mirror plane surfaces and directed towards the respective associated mirror plane surface, so that the plurality of camera pairs look into substantially radial directions via the respective associated mirror plane surface, wherein, for each camera pair, virtual positions of pivot points of the cameras of the respective camera pair are offset from each other along a straight baseline which is offset from the axis, and a distance between virtual points of a left-hand channel camera of a first camera pair associated with a first mirror plane surface and a right-hand channel camera of a second camera pair associated with a second mirror plane surface positioned neighboring the first mirror plane surface deviates from a length of the baselines of the camera pairs by less than 10% of the length of the baselines, wherein center points of the baselines of all stereo camera pairs lie on a circle with radius d around axis within a deviation of 10% of d, and the length of the baselines varies within 10% of a mean baseline length B with $$d = -\frac{B}{2}\frac{\sin(\alpha)}{(1-\cos(\alpha))} + \frac{B}{2}\sqrt{\frac{2}{1-\cos(\alpha)}}$$

wherein α is the angular aperture of the mirror plane surfaces.

Another embodiment may have a computer program having a program code for performing, when running on a computer, the above method for capturing panoramic or semi-panoramic 3D scenes.

A basic idea underlying the present invention is that the provision of high quality panoramic or semi-panoramic 3D scenes may be achieved at reasonable efforts if the plurality of camera pairs, each of which is associated with a respective one of mirror plane surfaces of a pyramid or clipped-pyramid shaped mirror in that same is directed towards the respective associated mirror plane surface, is arranged such that for each camera pair the virtual positions of pivot points of the cameras of the respective camera pair are offset from each other along a straight baseline which, in turn, is offset from the axis of the mirror pyramid or clipped-pyramid, and a distance between virtual points of a left-hand channel camera of a first camera pair associated with a first mirror plane surface and a right-hand channel camera of a second camera pair associated with a second mirror plane surface positioned neighboring the first mirror plane surface (namely, the right of the first mirror plane surface), may be equal to the length of the common stereo baseline of the camera pairs and, more generally, deviates from a length of the baselines of the camera pairs by less than 10% of the mean length of the baselines, such as, for example, owing to mechanical tolerances. To be more precise, the inventors of the present invention found out that the aforementioned fundamental conflict between the two competing requirements imposed by the stitching of the partial scenes of neighboring camera pairs on the one hand, and the creation of enough stereo impression by use of sufficient parallax on the other hand, may be solved or at least alleviated when the baselines of the camera pairs are not only offset from the center axis of the mirror in order to allow for an overlap between neighboring fields of view of neighboring camera pairs, but when these baseline offsets are additionally set in relation to the baseline length of the baselines of the camera pairs such that the virtual image points of pivot points of a left-hand channel camera of a respective camera pair, and the right-hand channel camera of another camera pair positioned to the right of the respective camera pair (when looking radially from the optical axis to the outside) have a distance between each other similar to the baseline length of the camera pairs. By doing so, for all pairs of neighboring camera pairs, the amount of parallax remains substantially equal, even across the fields of view of neighboring camera pairs so that stitching of partial 3D scenes obtained by the individual camera pairs does not lead to unpleasant irregularities at the transitions between these neighboring fields of views. In this context, the inventors also found out that respecting the above condition yields an optimal approximation of concentric mosaics (i.e. the theoretically ideal camera configuration for capturing 3D stereo panoramas, see above) in dependence of the given opening angle (angular aperture) of the used mirror surfaces. The approximation error decreases with decreasing opening angles of the mirror surfaces and the system converges to the ideal case of concentric mosaics for infinitesimally small opening angles of the mirror surfaces. Hence, the mathematical framework behind the solution can also be used to define the minimal opening angle where the approximation error can be neglected under the given capturing conditions and scene properties. Further, it can also be used to design the pyramid or clipped-pyramid shaped mirror, in particular the distance of the mirror from the cameras, to obtain sufficiently large overlaps between neighboring fields of view of neighboring camera pairs of same stereo channel for subsequent blending and stitching.

BRIEF DESCRIPTION OF THE DRAWINGS

Embodiments of the present invention are described in more detail below with respect to the figures, among which:

FIG. 1E shows schematically the problems resulting in stitching pictures using the star-like approach of FIG. 1C;

FIG. 3A shows the original camera views arranged side by side in their order along the lateral angle direction; FIG. 3B shows the views after a geometrical correction and warping; FIG. 3C shows the views after photometrical correction, color matching and blending, i.e. stitched together; and FIG. 3D shows in a final cut-out of panoramic view created by cropping the views having been stitched together;

FIG. 6B is shown by dashed lines 6a-6a and 6b-6b, respectively;

FIG. 8A shows left and right views from one regular stereo pair belonging to the same mirror segment, while FIG. 8B shows stereo content from a virtual stereo pair across neighbored mirror segments.

DETAILED DESCRIPTION OF THE INVENTION

Figure 1A:
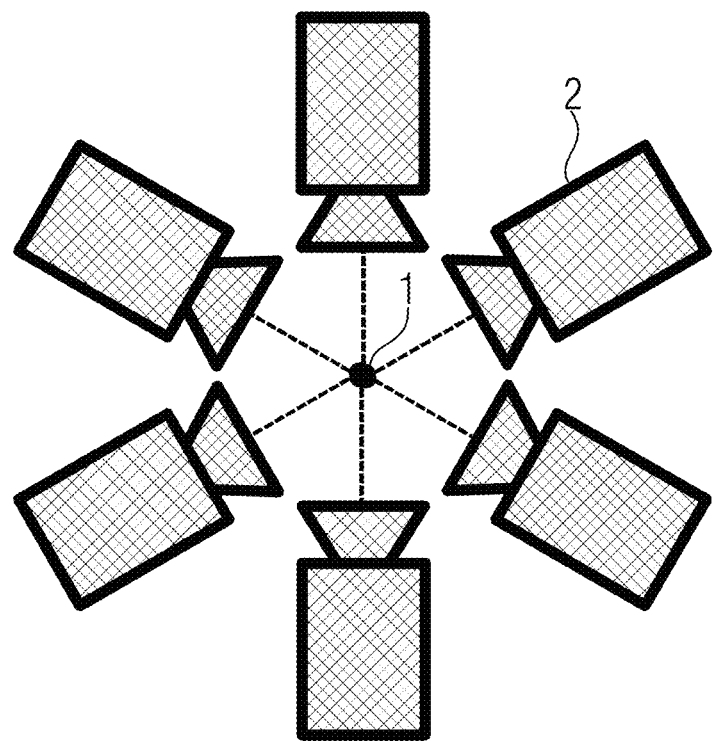
FIG. 1A shows a schematic diagram of an optimal camera arrangement for a 2D omni-directional recording.
Figure 1B:
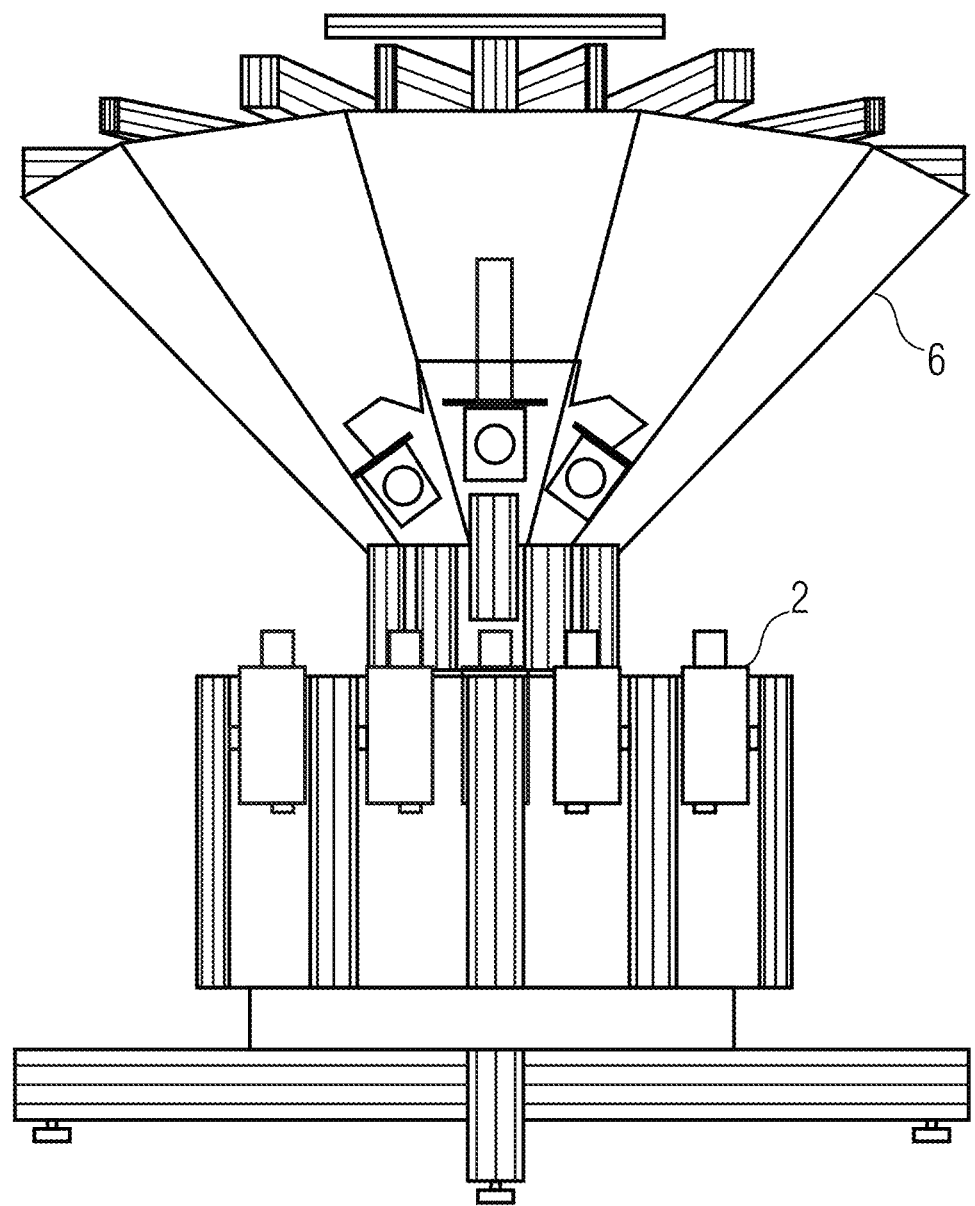
FIG. 1B shows a 3D view of a possible implementation of the camera arrangement of FIG. 1A using a mirror rig.
Figure 1C:
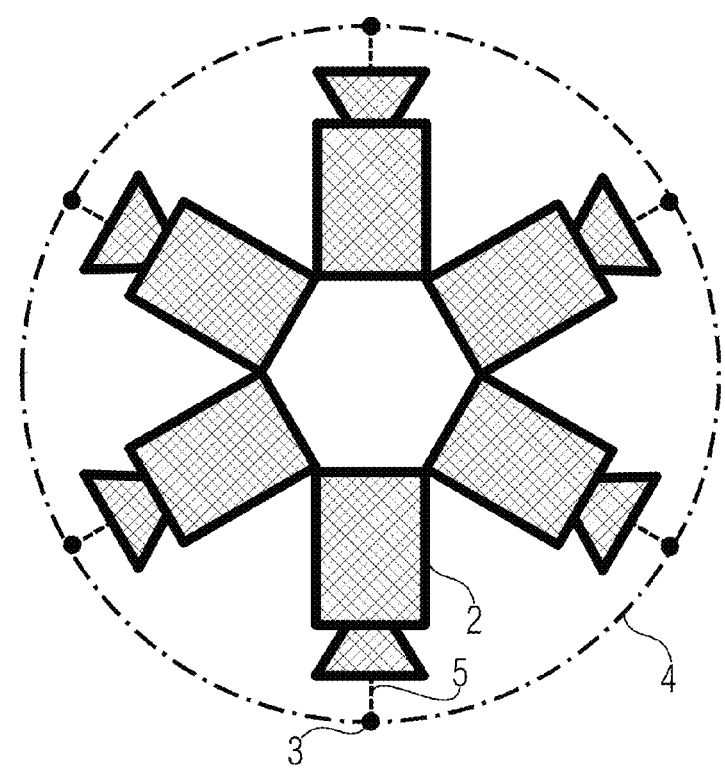
FIG. 1C shows a schematic diagram of another star-like camera arrangement for 2D omni-directional recordings.
Figure 1D:
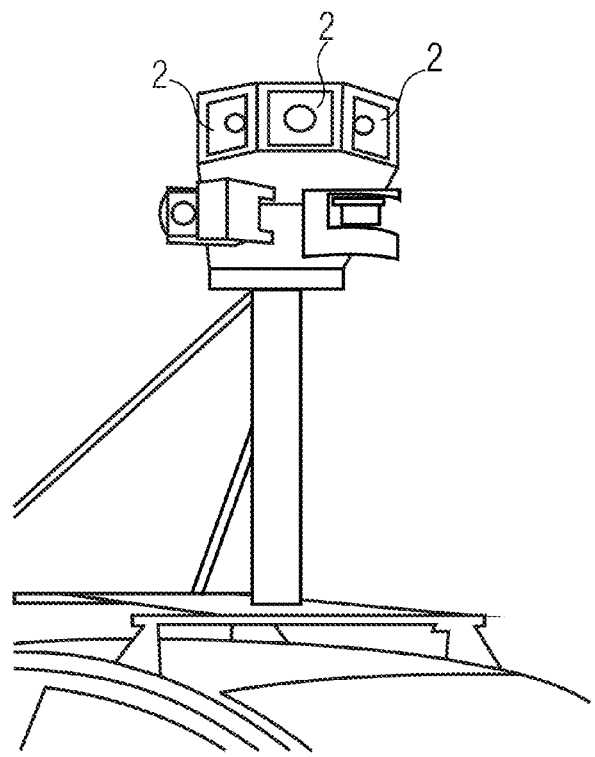
FIG. 1D shows a three-dimensional view of a possible implementation of the camera arrangement of FIG. 1C.

Whenever the same reference signs occur in the Figures, the explanation of the elements indicated using these reference signs presented with respect to one Fig. shall equally apply to the other figures where the same reference sign occurs, except for deviations explicitly mentioned.

FIGS. 6A, 6B, 6C, and 6D show an apparatus for capturing panoramic or semi-panoramic 3D scenes. The apparatus comprises a mirror 10 the surface of which is rotationally symmetric about an axis 12 and is a combination of tilted mirror plane surfaces 10a, 10b and 10c (segments), the normal vectors 13 of which each intersects the axis 12 and has the same angle β relative to a plane perpendicular to axis 12. In other words, the overall mirror surface of mirror 10 resulting from the combination of mirror plane surfaces 10a, 10b and 10c results in a pyramid or a clipped pyramid having a polygonal base which may be, but is not necessarily, regular.

Further, the apparatus comprises a plurality of camera pairs, i.e. stereo cameras, with each of these camera pairs forming a stereo sub-system of the apparatus. Each of these camera pairs and stereo sub-systems, respectively, comprises two cameras 14a and 14b for left-eye and right-eye stereo channels, respectively. Generally, each pair of cameras 14a and 14b is associated with a respective mirror plane surface 10a, 10b and 10c and these two cameras are directed towards this associated mirror plane surface, so that they look into a substantially radial direction 17 via the associated mirror plane surface.

Figure 6A:
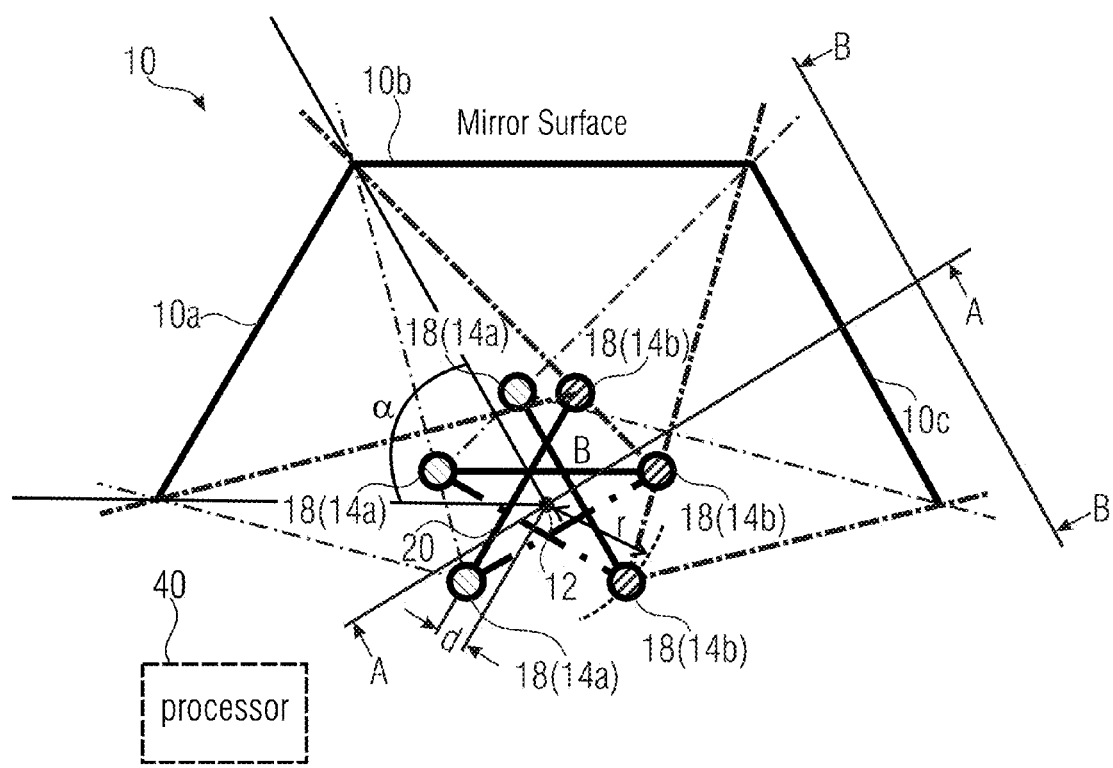
FIG. 6A shows a schematic sectional view of an apparatus for optimal capturing panoramic or semi-panoramic 3D video scenes in accordance with a mirror-based embodiment.
Figure 6B:
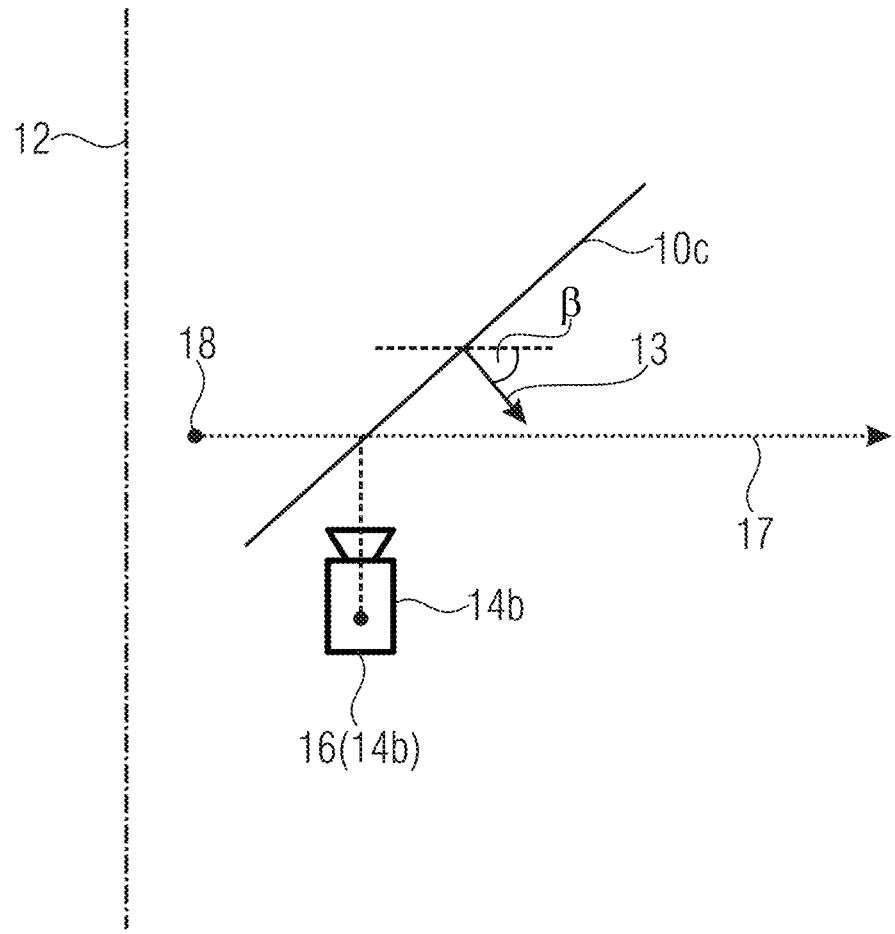
FIG. 6B shows a projection view onto plane A-A indicated in FIG. 6A.
Figure 6C:
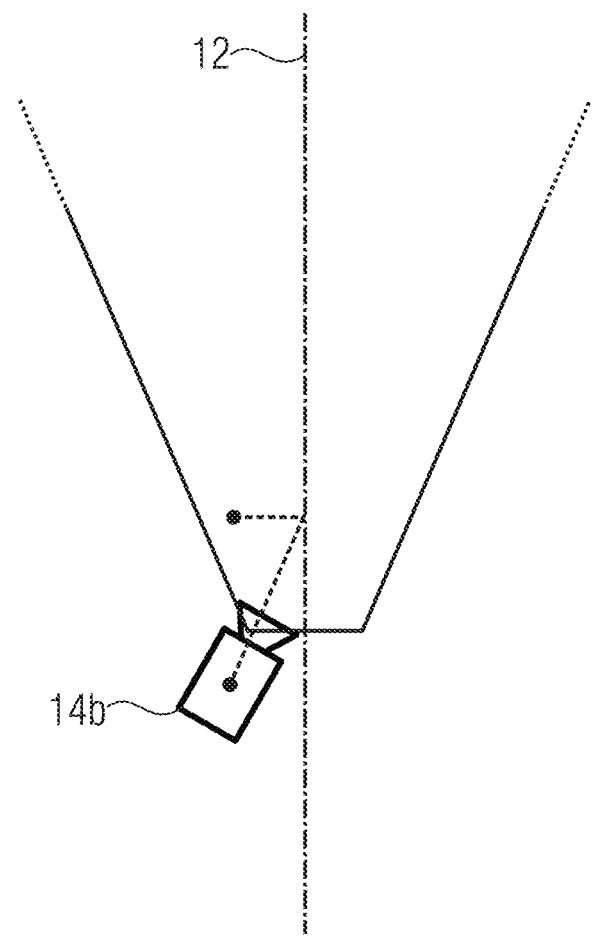
FIG. 6C shows a protection view onto plane B-B indicated in FIG. 6A.
Figure 6D:
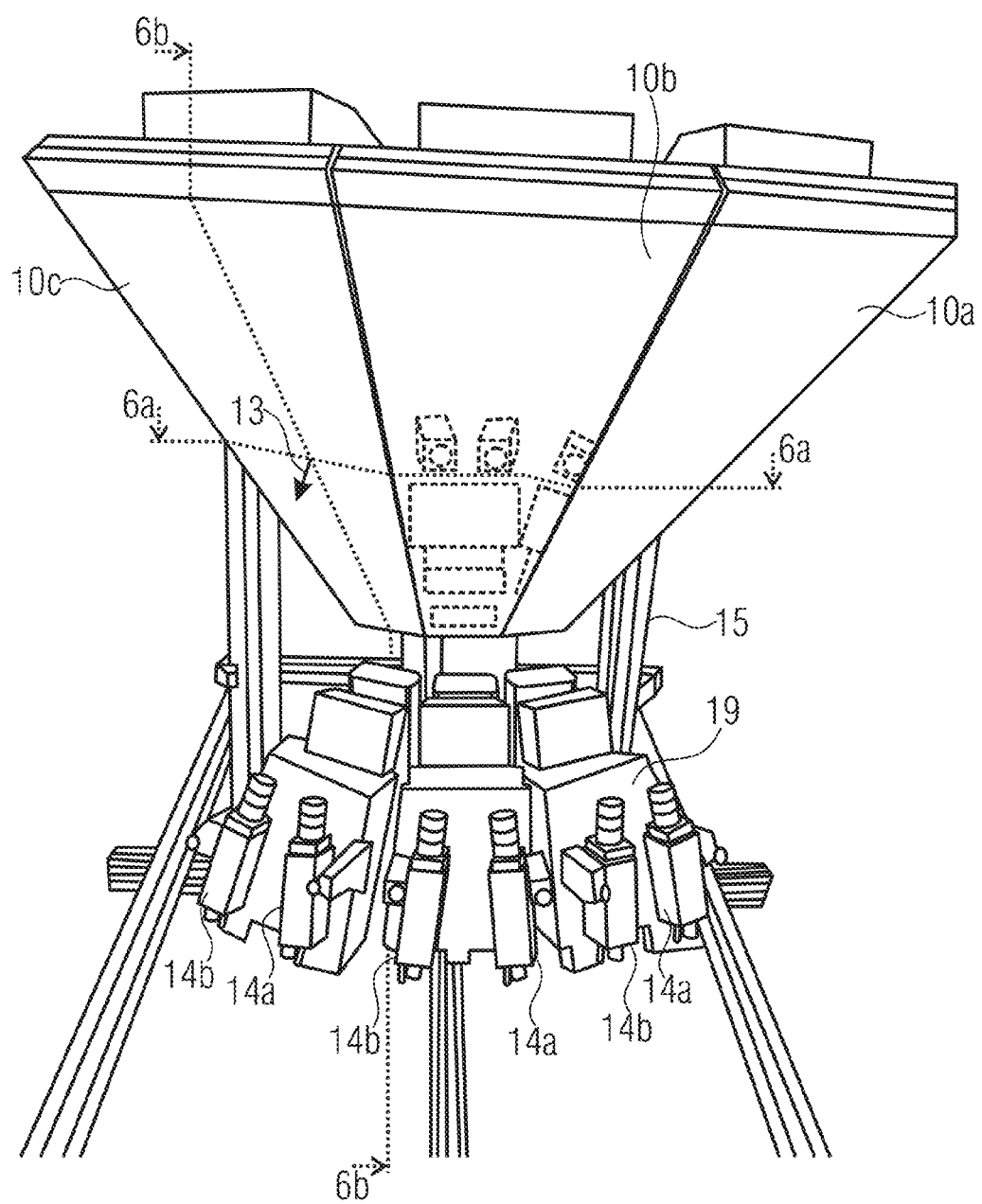
FIG. 6D shows a three-dimensional view of the mirror and camera pair of the apparatus of FIG. 6A, the sectional and projection planes of FIG. 6A

As shown in FIG. 6D, a support frame 15 may be provided in order to carry the mirror 10 as well as the cameras 14. Each camera pair together forming a stereo subsystem, may be adjustably attached to a board 19 of the support frame 15 separately which, in turn, may be adjustably affixed to the support frame 15. The adjustability may encompass camera rotations and displacements and may be achieved by manual adjustability or adjustability via respective actuators. Set screws may be provided to retain a justified setting. Similarly, the mirror plane surface 10a, 10b and 10c may be individually adjustable in terms of tilts and displacements.

Each camera has along its optical axis the above-mentioned focal point. To be more precise, each camera has a nodal point or pivot point or, in even alternative words, a center of its entrance pupil. These nodal points are indicated by reference sign 16 along with the corresponding reference sign of the respective camera (wherein "14b" shall indicate a camera which forms the right-hand channel of a respective stereo sub-system whereas "14a" shall indicate a left-hand channel of a respective stereo sub-system. Please note that, due to the mirroring at the mirror segments and the toe-in of the cameras, the actual arrangement of the left and right hand channel cameras relative to each other, is switched in the present embodiment).

In any case, the cameras 14 may be positioned or arranged such that the virtual positions 18 of the nodal points 16 of the cameras 14a and 14b together forming a respective stereo sub-system pair are offset from each other along a straight baseline 20 which is offset from axis 12 by a distance d. Distance d may be selected such that the distance between the virtual nodal points 18 of the left camera 14a of a stereo sub-system of one mirror segment (e.g. 10a) and the right camera 14b of the stereo sub-system of the next (or neighboring) mirror segment, e.g. 10b, is equal (in length) to baseline 20:

$$d = -\frac{B}{2}\frac{\sin(\alpha)}{(1-\cos(\alpha))} + \frac{B}{2}\sqrt{\frac{2}{1-\cos(\alpha)}}$$

wherein α is the angular aperture of the individual mirror segments 10a,b,c and B denotes the length of baseline 20. In even other words, the interaxial left-right distance between cameras within one mirror segment, i.e. length of baseline 20, (see solid bold lines in FIG. 6A) is the same as the inter-axial left-right distance between adjacent (crossed) mirror segments (see dashed bold lines in FIG. 6A). Of course, the equality is not restricted to be exact due to, for example, tolerances of mechanical adjustments. For example, the baseline length of baselines 20 may deviate from the (virtual) nodal point 18 distances between the just-mentioned different-eye cameras of neighboring stereo sub-systems of neighboring mirror segments by less than 10% of the (mean) length of baselines 20. However, even the baseline 20 lengths may vary to some extent such as, for example, within 10% of the mean baseline 20 length. The virtual nodal points 18 may be positioned symmetrically— left and right—to a plane spanned by the vector 13 and the axis 12 (for each mirror segment or a subset thereof). In particular, the center points of the baselines of all stereo subsystems may—exactly or substantially, such as within a deviation of 10% of d—lie on a circle with radius d around axis 12 and, hence, the virtual points 18 of all cameras may—exactly or substantially, such as within a deviation of 10% of d—lie on a circle with radius r:

$$r = \sqrt{d^2 + (B/2)^2}$$

Further, the selection of distance d and radius r may also influence the design of the pyramid or clipped-pyramid shaped mirror, in particular the distance of the mirrors from the cameras, such that the overlap between field of views of cameras of neighboring stereo sub-systems overlap each other by a certain number of pixel lines (columns, for example), such as 5 to 20 lines (in average along the direction of these lines, such as along the columns). A critical distance between mirror and camera is reached if the line through virtual nodal points 18 of same stereo channel (either left or right channel) of two neighboring mirror segments (e.g. virtual nodal points 18 of left-hand cameras 14a associated to mirror surfaces 10a and 10b) intersects with the corresponding edge between the two mirror surfaces (e.g. 10a and 10b). This state is also shown in FIG. 6A (see dashed lines through virtual nodal points 18 of same cameras, either 14a or 14b, of neighboring mirror segments). In this state, the overlap between neighboring views of same stereo channel is equal to zero. Note that this limit case depends on the selection of d and, with it, of baseline B. In case of larger distances between camera and mirrors the overlap increases accordingly and can be used for blending the field of views of cameras of neighboring stereo sub-systems as desired. In case of smaller distances the overlap disappears and gaps between neighboring views will appear and the desired overlap can only be achieved by deviations of d from its ideal setting. Hence, for a given application, the optimal solution is to set d first to an almost optimal value in dependence of B and angular aperture α (see equation above) and to define a suitable distance between mirror and camera that allows sufficiently high overlaps in dependence of these settings afterwards. If baseline B is variable in certain limits, as it is often the case in stereo applications, the selection of the distance between mirror and cameras has to be done in accordance with the highest baseline B that can be selected in the whole system. Note that the angular aperture α is usually fixed and can usually not be changed in a given installation.

To be more precise, the virtual points 18 may be positioned behind mirror plane surfaces 10a,b,c at positions resulting from mirroring the positions of the nodal points 16 at the plane of the associated mirror plane surface 10a,b,c so that the optical axes are directed towards the respective associated mirror plane surface and the plurality of camera pairs look into substantially radial directions 17 via the respective associated mirror plane surface (FIG. 6B). To be more precise, the optical axes through virtual nodal points 18 of the plurality of camera pairs should lie in same plane perpendicular to axis 12 as radial direction 17. This plane may be the sectional plane shown in FIG. 6A. In other words, if the normal vectors 13 of mirror surfaces 10a,b,c have an angle of β=45° relative to a plane perpendicular to axis 12, as it is often the case in omni-directional camera systems, cameras 14a and 14b may have their optical axis extending substantially in parallel to axis 12 (FIG. 6B). In case of other angles β, however, the cameras have to be rotated accordingly in a plane extending through axis 12 and the corresponding nodal points 16 so that the optical axes through virtual nodal points 18 are kept in the same plane perpendicular to axis 12.

Further, cameras 14a and 14b of each camera pair may be toed-in such that optical axis of the cameras 14a and 14b intersect each other at the mirror plane surface with which the respective camera pair is associated. To be more precise, the optical axes of both cameras may be rotated in opposite directions in a plane that is spanned by the optical axis of one camera (e.g. 14a) and the pivot point 16 of the other camera (e.g. 14b) such that the optical axes cross each other at the mirror plane surface with which the respective camera pair is associated (see example in FIG. 6C for camera 14b whereas camera 14c would be rotated in opposite direction). By this measure, the image format is better adapted to the mirror plane surfaces and the portion they cover from the field of view of the respective cameras (i.e. the image portion that is cropped by the edges of the mirror is minimized). Due to the same reason, the cameras 14a and 14b in FIG. 6C may even be rotated (rolled) in opposite directions around their optical axes. In particular, cameras 14b may be rolled clockwise while cameras 14a are rolled counter-clockwise relative to an arrangement where the pixel columns of the cameras extend in parallel, so that the pixel column directions of the cameras intersect each other at the side where the axis 12 is positioned.

That is, summarizing the above, FIGS. 6A to 6D show an apparatus for capturing a panoramic or semi-panoramic 3D scene. That is, the apparatus may be configured to output merely a collection of pairs of pictures, each pair of pictures stemming from one of the stereo cameras further described below. Alternatively, the apparatus may be configured to output two stitched panoramic or semi-panoramic 2D views, one for a right-hand channel and the other for the left-hand channel. The lateral or horizontal angle range (coverage) of the captured panoramic and semi-panoramic 3D scene may cover 360° or a part thereof, i.e. less than 360°. The range may be greater than or equal to 180°.

The apparatus comprises a mirror 10 having a mirror surface composed of mirror plane surfaces 10a to 10c, together forming a pyramid or clipped-pyramid with a polygonal base and an axis 12. As shown in FIGS. 6A to 6D, mirror 10 may be implemented such that piecewise rotations of the mirror 10 around axis 12 at angles of 360° divided by the number of mirror plane surfaces 10a to 10c results in the mirror 10 coinciding with its original position. However, as shown in 6A to 6D, mirror 10 does not necessarily cover the full 360° around the axis or height of the pyramid or clipped-pyramid, but may cover also less than 360%. In any case, the mirror plane surfaces 10a, 10b and 10c are arranged like sides of a pyramid or clipped-pyramid with a polygonal base and an associated axis of the pyramid or clipped pyramid, the mirror plane surfaces contacting each other at edges of the pyramid or clipped-pyramid.

Further, the apparatus comprises the plurality of camera pairs, each of which is associated with a respective one of the mirror plane surfaces 10a to 10c and directed towards the respective associated mirror plane surface so that the plurality of camera pairs look into substantially radial directions 16 via the respective associated mirror plane surface. For each camera pair, virtual positions 18 of pivot points 16 of the cameras 14a and 14b of the respective camera pair are offset from each other along a straight baseline 20 which is offset by distance d from the axis 12. A distance between virtual points 18 of a left-hand channel camera 14a of a first camera pair associated with a first mirror plane surface and a right-hand channel camera 14b of a second camera pair associated with a second mirror plane surface positioned neighboring the right of the first mirror plane surface (when looking radially from the optical axis to the outside) and contacting the first mirror plane surface at a respective pyramid edge between same, deviates from a (e.g. mean) length of the baselines 20 of the camera pairs by less than 10% of the length of the baselines. Naturally, the condition just mentioned regarding the deviation of the virtual point distance and the length of the baselines may be valid for all pairs of neighboring mirror plane surface and the associated camera pairs. Further, as had also already mentioned above, the exact equality of the lengths is of advantage and forms the ideal state.

Regarding the length of the baselines 20, it has already been mentioned above that same may denote the mean baseline length of the baselines 20, and that the length of the baselines may vary within 10% of this mean baseline length. Again, as had also already mentioned above, the exact equality of the baselines 20 is of advantage and forms the ideal state.

As has also been described above, the apparatus may be configured such that, for each camera pair, the virtual points 18 of the pivot points 16 of the cameras 14a and 14b of the respective camera pair may be positioned symmetrically left and right to a plane spanned by a normal vector 13 of the respective associated mirror plane surface and the axis 12 of mirror 10.

Next, the center points of the baselines B of the cameras 14a and 14b may all lie on a circle with radius d around axis 12 and, hence, the virtual points 18 of the pivot points 16 of the cameras 14a and 14b may all lie on a circle with the radius r. It may also be, however, that the virtual points 18 are distributed around that circle within a deviation of 10% of radius r at the maximum. Nevertheless, the virtual pair points 18 may all lie within a common plane of that circle, which, in turn, may be arranged perpendicular to axis 12. This plane may be the sectional plane shown in FIG. 6A.

As has also been described above, the apparatus may be configured such that the overlap between fields of view of two channel cameras being of the same channel, i.e. either left or right, but belonging to different neighboring camera pairs, overlap each other by 5 to 20 pixel lines, averaged along a direction of the pixel lines. As described above, the pixel lines may be rows of the cameras, which, as described above, may be used in a portrait capturing manner. Moreover, naturally, the overlap may be valid for all such pairs of cameras of the same channel, but of different camera pairs/stereo subsystems. As also described above, a suitable overlap may be achieved by exceeding a critical distance between cameras and mirrors that can be calculated in dependence on baseline B, angular aperture α and resulting off-center distance d.

Then, as has also been described above, the cameras 14a and 14b of the camera pairs (stereo subsystems) may be arranged so as to look into substantially radial directions 17 via the respective associated mirror plane surface. In case of mirror surfaces with an angle of 45° relatively to the axis 12, the cameras 14a and 14b of the camera pairs (stereo subsystems) may have its respective optical axis extending substantially in parallel to the axis 12. In any other case, however, the cameras 14a and 14b might be rotated accordingly relative to a plane running through the axis 12 of mirror 10 and the pivot points of the respective camera. In particular, the cameras 14a and 14b of each camera pair may be toed-in such that optical axis of the cameras 14a and 14b intersect each other. To be even more precise, the cameras 14a and 14b of each camera pair may be toed-in such that the optical axis of the cameras 14a and 14b of the respective camera pair intersect each other at the mirror plane surface with which the respective camera pair is associated. By this measure, the image format is better adapted to the mirror plane surface. Because of the same reason, the cameras may also be rotated (rolled) in opposite directions around their optical axes. Further, all cameras might be used in portrait format instead of the usual landscape format. In even other words, the cameras 14a and 14b are arranged such that their row direction substantially extends radially, whereas the column direction of the pixel arrays of the cameras substantially extend tangentially relative to axis 12, with the field of view being wider in row direction than in column direction.

As illustrated in FIG. 6A, the apparatus may optionally comprise a processor 40 being connected to, or being connectable to, the cameras 14a and 14b of the camera pairs. Processor 40 may be configured to perform stitching as further described below. If processor 40 is not present, the apparatus may output the pictures of the cameras as they are.

Figure 7:
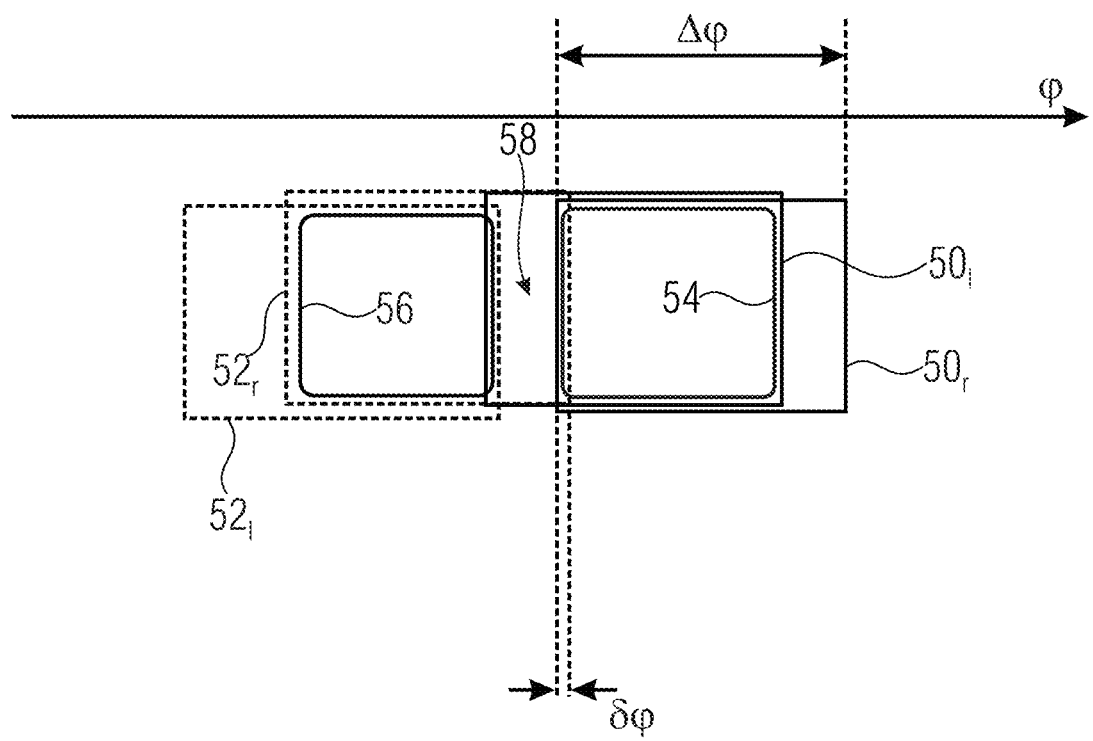
FIG. 7 shows schematically the fields of view of the cameras of neighboring camera pairs of the apparatus of FIGS. 6A and 6D in order to illustrate the process of stitching the captured stereo images along a lateral or horizontal angle range (coverage) of a panoramic and semi-panoramic stereo image and its derivation from corresponding pairs of cameras, namely cameras of the same camera pair (regular camera pairs) and cross-linked pairs of cameras of neighboring camera pairs (virtual stereo pairs)

In order to more clearly describe a possible operational mode of processor 40, reference is made to FIG. 7. In FIG. 7, the axis denoted by φ indicates a horizontal or lateral view direction measured around axis 12 in an cylindrical coordinate system (looking from outside onto axis 12). Further, FIG. 7 illustrates related fields of view of the cameras of a pair of neighboring camera pairs by rectangles. As can be seen, FIG. 7 assumes the width Δφ along direction φ of each rectangle representing the camera views to be equal to each other although this is not necessarily the case. The shape is also not necessarily an exact rectangular, but might be somewhat distorted.

The fields of view of the two cameras of a first camera pair is shown by solid lines, whereas the fields of view of the two cameras of the neighboring camera pair is shown by dashed lines. Imagine, for example, the fields of view shown with the dashed lines were those of the cameras 14a and 14b associated with mirror surface 10c, whereas those shown with solid lines were those of cameras 14a and 14b associated with the mirror surface 10b. In that case, the angle φ is measured counter-clockwise in FIG. 6A and the field of view 50r of the right-hand channel camera of camera pair belonging to mirror surface 10b overlaps with the field of view 52r of the right-hand channel of the neighboring camera pair belonging to mirror surface 10c exemplarily by δφ, which may correspond, as already noted above, to an angle interval corresponding to 5-20 times the pixel pitch of the pixel arrays of the cameras measured in direction cp. Naturally, the same overlap results for the fields of view of the left-hand channel cameras, namely 50l and 52l of cameras 14b associated with mirror surfaces 10c and 10b, respectively.

Generally, as also illustrated in FIG. 7, the camera views 14a and 14b of one camera pair (e.g. 52r and 52l) are usually shifted against each other in direction cp. Hence, different stereo zones have to be defined. There are regular stereo zones where the stereo content is composed by camera views of a regular camera pair associated with same mirror surface. In FIG. 7 such a regular stereo zone is for example indicated by region 54, where the stereo content is given by camera views 50l and 50r of a regular stereo pair with cameras 14a and 14b associated with same mirror surface 10b. In analogy, overlap region 56 refers to stereo content from camera views 52l and 52r of a regular stereo pair with cameras 14a and 14b associated with same mirror surface 10c. In between, there are mixed stereo zones, such as region 58 in FIG. 7, where the stereo content is composed by crossed stereo pairs, where the left-hand channel comes from 50*l* of left camera 14*a* associated to mirror surface 10*b* and the right-hand channels comes from 52*r* of right camera 14*b* associated to mirror surface 10*c*.

To obtain a consistent panoramic or semi-panoramic 3D stereo image, the stitching from processor 40 has to respect a couple of requirements related to these regions:

Depth in panoramic or semi-panoramic 3D stereo image should be represented by horizontal disparities in direction φ only, whereas vertical disparities perpendicular to φ have to be avoided. To be more precise, corresponding image feature points between left-hand and right-hand panoramic stereo view should be at the same line of the panoramic image, whereas their positions at the same line may be different. The disparity representing the depth of a feature point is then defined by difference between the two positions of corresponding feature points at same scan line.

In the ideal case the depth range, or, to be more precise, the difference between maximal and minimal disparity, or the deviation, as it is also often called, should be exactly the same in all regular and mixed stereo zones or should be at least almost in the same range with certain limits in practice.

The convergence plane, i.e. the depth level of the scene that will later appear at the screen, should be the same over all regular and mixed stereo zones. To be more precise, an object that moves at constant depth around axis 12 while capturing the scene should also keep constant depth in the stereo representation after stitching. Or even more precise, it should appear at same depth relatively to the screen (either before or behind or at the screen) while projecting the stereo content.

The condition of having the same depth range over all regular stereo zones is already achieved by keeping the baselines B of all camera pairs in FIG. 6A constant in certain limits. Moreover, the condition of having the same depth range across regular and mixed stereo zones is respected by keeping the distance between virtual points 18 of a left-hand channel camera 14*a* of a camera pair associated with a first mirror plane surface (e.g. 10*b*) and a right-hand channel camera 14*b* of a second camera pair associated with a mirror plane surface positioned neighboring the right of the first mirror plane surface (e.g. 10*c*) almost equal to (mean) baseline B of the regular stereo pairs (see FIG. 6A). As already mentioned, the conditions may only be fulfilled with tolerances of 10% due to practical reasons. But these tolerances are in the range that is allowed from psycho-physical point of view and where deviations in depth are usually not perceived by the spectator.

Whereas the above condition is already respected by the set-up of the camera configuration in accordance to FIG. 6A and, with it, by the core feature of this invention, the other conditions have to be achieved during stitching from processor 40. However, due to the fact that the above main condition of having same depth ranges in regular and mixed stereo zones is already given by the camera configuration from FIG. 6A, the remaining stitching process is quite simple and can be achieved by conventional methods. There might be several approaches on the remaining stitching process. One possibility is described as an example in the following:

Subsets of adjacent camera views are first stitched separately for left-hand and right-hand stereo channel onto corresponding reference planes by using conventional stitching methods (e.g. by using camera calibration or test pattern). For example, a triple of adjacent camera views of the left-hand channel is stitched together by using the image plane of the center camera of the left-hand camera triple as reference. Same is done separately for the related triple of camera views for the right-hand channel, but now using the image plane of the center camera of the right-hand camera triple as reference.

Corresponding triples of stitched left-hand and right-hand camera views are then rectified by conventional rectification methods as well known from stereo vision. After rectification each triple is well line-aligned. To be more precise, after rectification only horizontal disparities exist between the left-hand and right-hand stitched stereo view of each triple and vertical disparities and misalignments should have been removed. Further, at this state the convergence plane is temporally set to infinity in all stereo triples (i.e. all stereo triples follow a parallel stereo geometry after rectification).

Using calibration data, all triples are then mapped onto specific locations of a cylindrical surface in accordance to FIG. 7 and feature-based stitching can be used to match the triples accurately at the cylindrical surface. Note that, in contrast to the original single camera views, the triples have enough overlap to use feature-based matching and stitching in this case. Moreover, as the triples have already been well rectified and line-aligned, the rectified state also holds for the panoramic stereo image after mapping the triples onto the cylindrical surface from FIG. 7.

The convergence plane can then be shifted from infinity to any desired depth level by rotating the two cylindrical surfaces of the left and right stereo channel in opposite direction around axis 12.

Again, it is noted that the cameras 14*a* and 14*b* may be used in portrait format although FIG. 7 suggests that they are used in landscape format. Using the landscape format may, however, also be possible. Further, FIG. 7 shows the fields of views of the regular camera pairs as overlapping merely partially, but this circumstance may also be achieved with the cameras of the regular pairs not being toed-in but rather having parallel optical axes.

As described with respect to FIG. 7, processor 40 may be provided so as to stitch together all the right-hand channel pictures or fields of view 40*a* and 42*a* on the one hand and all the pictures of fields of view 50*l* and 52*l* of the left-hand channel cameras on the other hand so as to obtain, separately, one two-dimensional panoramic view for the left channel and another continuous panoramic picture for the other channel while respecting the above requirements on panoramic or semi-panoramic stereo content of high quality.

Thus, the above-described embodiments of FIGS. 6A to 6D show a mirror-based panoramic 3D camera that can be considered as an approximation of concentric mosaics by using video cameras such as described in [27]. The approximation error decreases with decreasing opening angles (angular aperture) of the mirror surfaces and the system converges to the ideal case of concentric mosaics for infinitesimally small opening angles of the mirror surfaces.

A test system that has been used as a proof-of-concept, exemplarily used mirror segments of 24° and two cameras behind each mirror. In general, referring to the above description of FIG. 6A to 6D and the mathematical framework behind it, the angle interval over which the mirror segments 10*a*, 10*b* and 10*c* extend along the φ axis, i.e their angular aperture, may be within 10° to 30° in practice. To be more precise, although in FIGS. 6A to 6D, for illustration purposes, the mirror segments were shown to be about 60° wide, they may be equal to or less than 30° wide so as to avoid stitching effects. 24° may be, for example, chosen, resulting in 15 segments for 360° view. The just-mentioned exact measures are the result of theoretical computations and practical proof-of-concept tests.

The stereo cameras were toed-in such that their optical axes intersect at the mirror surface. The stereo baselines were chosen in a range of 40 to 70 mm to control the depth volume. The 3D camera rig was highly modular and it allowed acquisition of live 3D panorama footage up to 180° or even 360°. The vertical field of view was exemplarily 60°. It may, however, alternatively lay somewhere else within 40° to 80°. For 360° panoramas the resulting resolution was 15,000 by 2,000 pixels per stereo view.

Figure 2A:
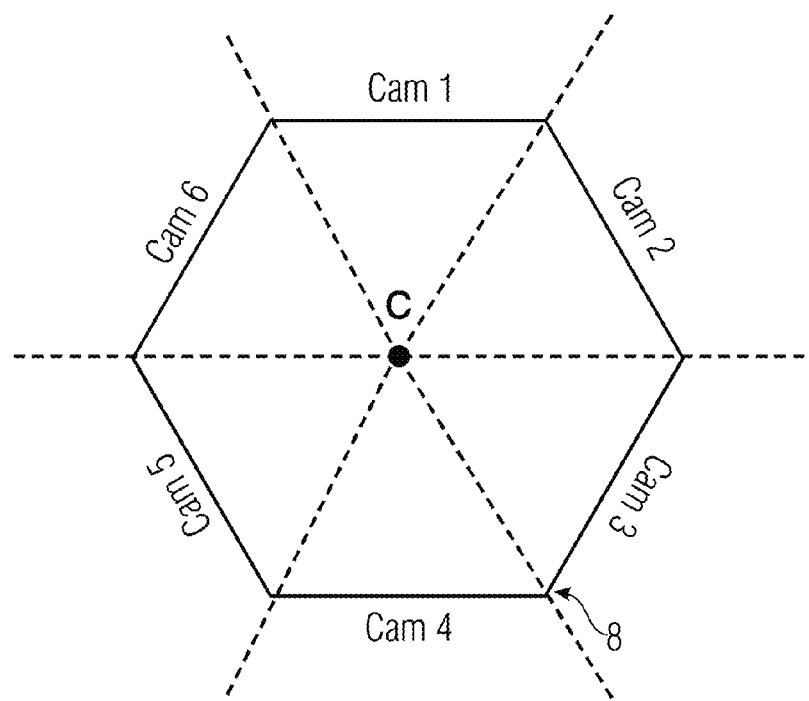
FIG. 2A shows a schematic sectional view of the mirror-based implementation according to FIG. 1B of the optimal camera arrangement of FIG. 1A.
Figure 2B:
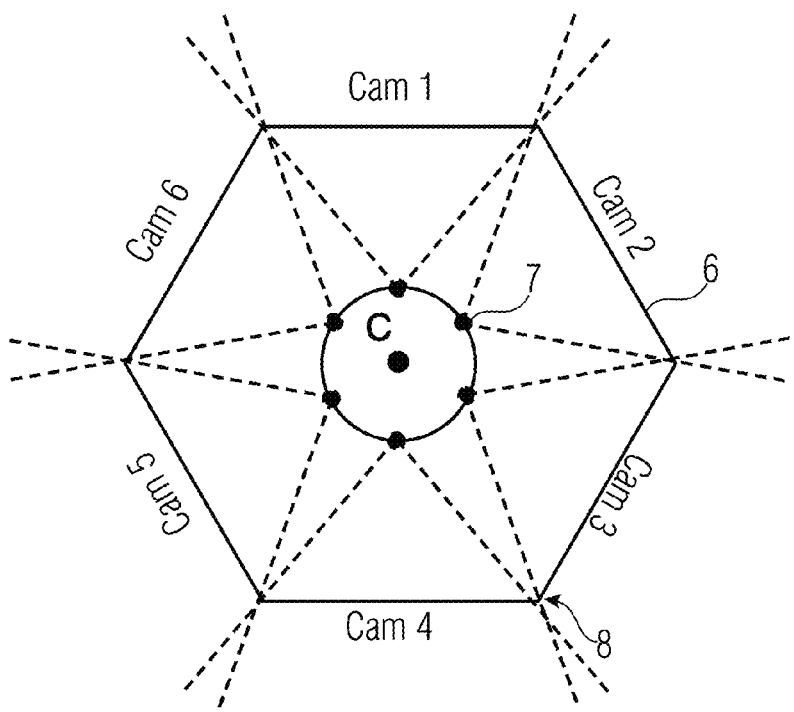
FIG. 2B shows a schematic sectional view and the same sectional plane as FIG. 2A of another mirror-based implementation according to FIG. 1B, but differing from the optimal camera arrangement of FIG. 1A in that the image points of the focal points of the cams are radially off-centered in order to avoid gaps in the surround view due to the edges between the mirror segments and to allow overlaps for blending and seamless stitching of the surround view.
Figure 3A:
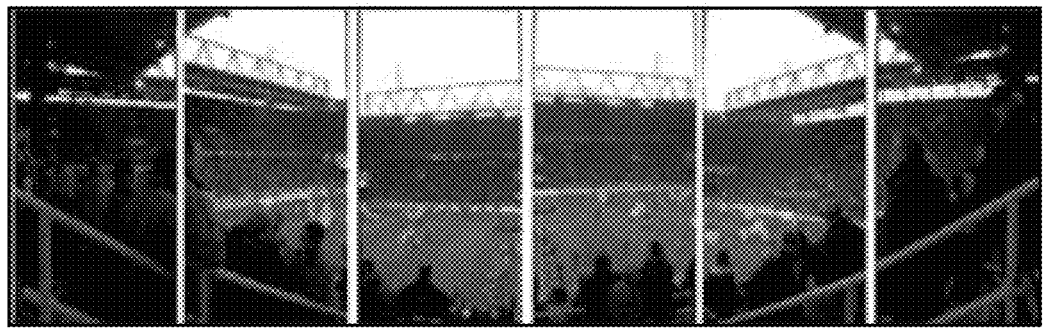
FIGS. 3A, 3B, 3C, 3D shows pictures of the individual cameras and their stitching together so as to yield a single 2D panoramic view after subsequent processing steps in a) to d).
Figure 3B:
Figure 3C:
Figure 3D:

In the above embodiments of FIGS. 6A to 6D, an exact calibration may take care that the systematical approximation error that appears in comparison to the ideal situation of concentric mosaics is minimized. In this context, FIG. 6A, somehow shows the optimal arrangement of the stereo sub-systems. In analogy to FIG. 2B, FIG. 6A again refers to a horizontal section through the mirror pyramid. As has been described above, the dots 18 indicate the virtual focal points of the left and right cameras 16a, 16b, respectively. The dash-dotted lines show the related fields-of-view and camera orientations defined by the mirrors. The solid lines between the dots 18 represent the inter-axial distance (baseline) of regular stereo pairs (i.e., both cameras are behind same mirror segment). In contrast, the dashed lines describe the inter-axial distance between the virtual focal points of a crossed stereo pair (i.e., left and right cameras are from different but adjacent mirror segments).

The optimal state with the minimized systematical approximation error is obtained if the regular baselines (solid black lines) are equal to the virtual baselines (dashed black lines). Note that the regular baselines are adjusted physically at stereo rigs themselves whereas the virtual baselines are mainly defined by the distance of the stereo rigs from the mirror surface. Hence, the same regular baseline for all stereo rigs has to be chosen first and then the distances from the mirror rigs to the mirrors have to be selected such that the virtual baselines are equal the regular ones. Finally, the cameras may be toed-in such that the fields-of-view fit to the borders of the mirror segments.

Figure 4A:
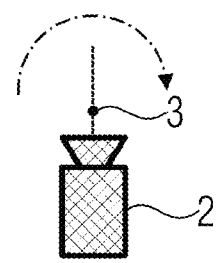
FIG. 4A shows a schematic diagram of an optimum solution for two dimensional omni-directional recording using a rotating camera.
Figure 4B:
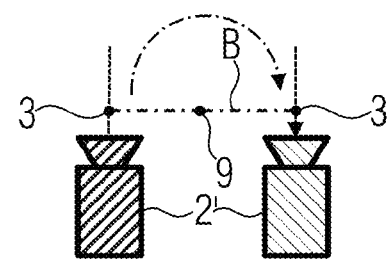
FIG. 4B shows a schematic diagram of an optimal solution for 3D omni-directional recording by rotating stereo camera around the center point of the stereo baseline
Figure 5:
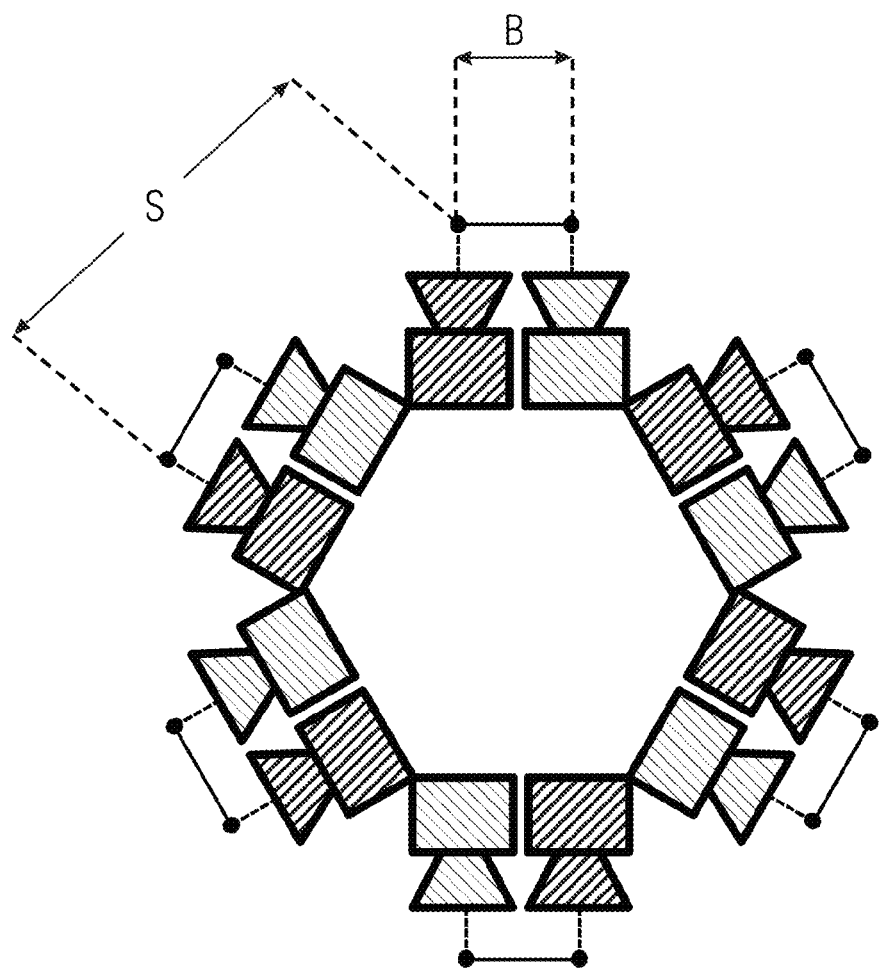
FIG. 5 shows a schematic diagram of a star-like arrangement for a panoramic 3D camera setup.

It is worthwhile to note that the baselines of the single stereo systems do not intersect at their center as one would assume from the optimal solution of concentric mosaics shown in FIG. 4B. In fact, the baseline centers are again slightly shifted in radial direction such that they are located at a small circle around the center of the mirror pyramid. On one hand, similar to the 2D-case, this off-center shift ensures some overlap for stitching and seamless blending between neighbored views of the left- or right-eye panorama. But, on other hand, in contrast to the 2D case, it cannot be chosen arbitrarily and is constrained by the above mentioned side-condition that virtual baselines should, to some minimum extent, equal regular ones. Interestingly, theoretical considerations have shown that the systematical approximation error compared to concentric mosaics is minimized when this more heuristic constraint is fulfilled. Moreover, the off-center shift decreases if the angle of the mirror segments decreases as well and becomes zero in case of infinitesimal mirror angles. Thus, concentric mosaics can be considered as the limiting case of the above constellation.

Figure 8A:
FIGS. 8A, 8B show stereo content captured with an implementation according to the embodiment of FIGS. 6A to 6D, where
Figure 8B:
Figure 9:
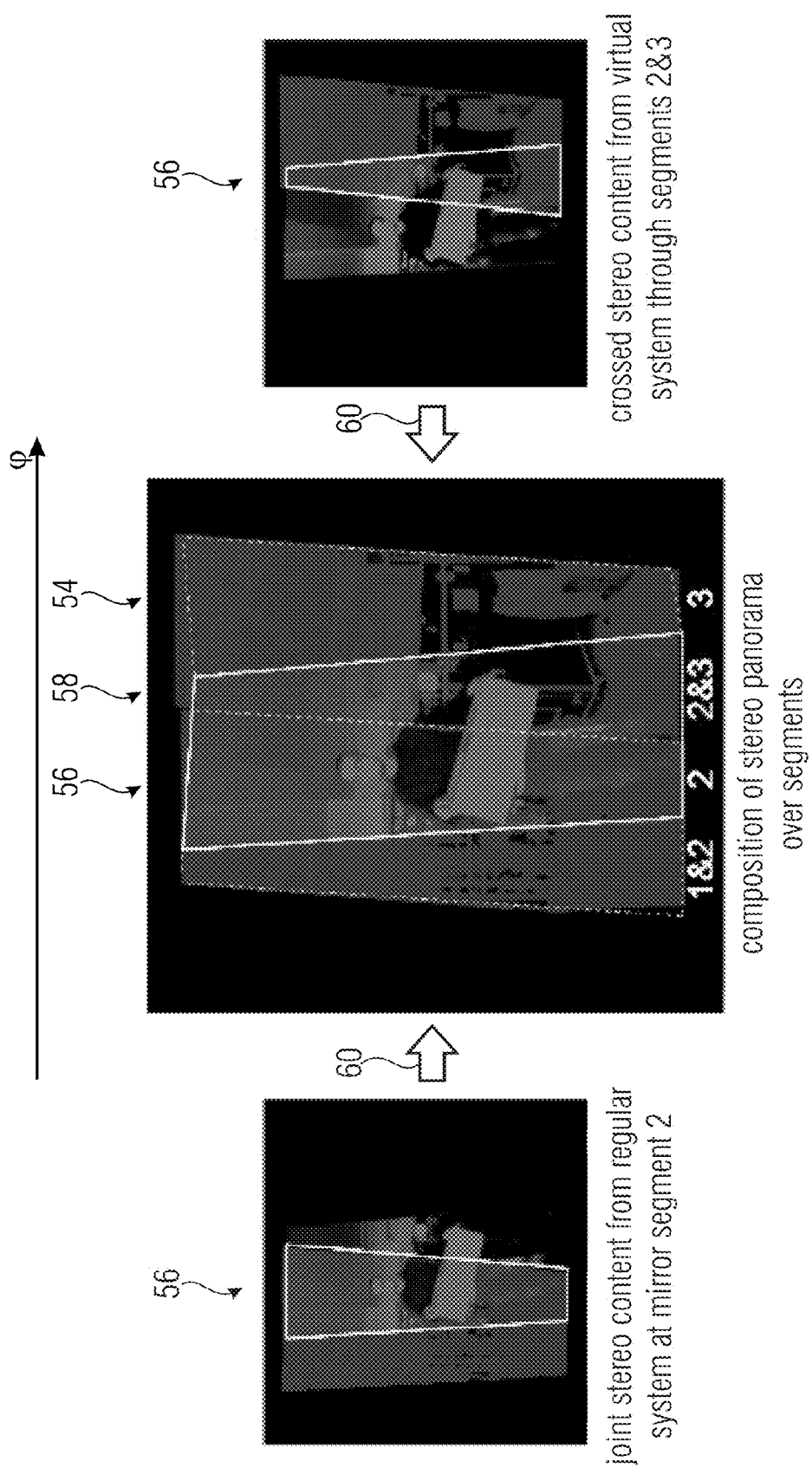
FIG. 9 schematically illustrate a composition scheme for generating 3D video panorama content from the stereo content shown in FIGS. 8A and 8B.

Due to the special camera arrangement shown in FIG. 6A and as already explained by the schematic Drawing in FIG. 7, the final composition of the 3D panorama consists of image parts from both, regular and virtual stereo pairs as shown in FIGS. 8A and 8B by the original camera images and FIG. 9 by using an anaglyph overlay representation after stitching. Hence, the results in FIG. 9 already show that panoramic stereo video can be captured with the presented novel multi-stereo camera setup based on mirrors.

The sheared rectangles with the solid white lines in FIGS. 8A and 8B show the effective image borders pruned by the mirror segments. The shearing is given by the fact that cameras are not positioned in the center of the mirror any longer but are moved horizontally by half a baseline to the left or right, respectively, and are additionally toed-in to compensate the shift. Note that the shearing has opposite directions in left and right views due to opposite horizontal movements and toe-ins. The shearing may be compensated by an additional roll of the cameras in opposite direction around their optical axes. By these means it may be possible to adapt the rectangular image formats even better to the mirror surfaces and to reduce the area of the active image sensor that is cropped by the mirror edges. However, this additional roll has not been used in the examples from FIGS. 8 and 9.

Furthermore, the left image pair in FIGS. 8A and 8B show the views of a regular stereo pair behind one particular mirror segment. It can be noticed that, in contrast to standard stereo applications, the overlap between the two views is considerably limited. The remaining parts have to be taken from related views in neighbored mirror segments or, in other words, from virtual stereo pairs as discussed in the previous section (see example in the right image pair in FIG. 9 and also the schematic drawing in FIG. 7). These circumstances also explain why the virtual baseline should be equal to the regular one. Otherwise, the depth scaling would permanently change throughout the entire 3D video panorama.

FIG. 9 shows how these images are overlaid and stitched to obtain the final 3D video panorama which process 60 may be performed by optional processor 40. An anaglyph representation has been used for this purpose. The sheared rectangle with the solid white lines in the center image refers to the left view of the stereo rig at mirror segment 2. The dashed white lines in the center image show the right views from the stereo rigs in mirror segments 2 and 3, respectively (i.e. 10b and 10c in FIG. 6A).

As a consequence, the size of overlapping areas between views with crossed content of a virtual stereo pair (e.g., left view from the stereo rig in mirror segment 2 and right view from the stereo rig in mirror segment 3, see trapeze with white border lines in right image of FIG. 9) is almost the same as the one between the views of a regular stereo pair (e.g., both views from the stereo rig in mirror segment 2, see corresponding trapeze in left image of FIG. 9).

Several test productions with ultra-high-resolution panoramic video have been made. They have proven the robustness and practicability of the apparatus of FIGS. 6A to 6D under real working conditions.

Thus, above embodiments achieve a system of a 3D omni-directional camera, which allows an almost error-free panoramic 3D video acquisition by using a special mirror rig.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

1. A. Majumder, "Intensity seamlessness in multi-projector multi-surface displays", Technical Report, Univ. of North Carolina, Chapel Hill, US, 1999.
2. K. Li, Y. Chen, "Optical blending for multi-projector display wall system", IEEE Proc. 12th Laser and Electro-Optics Society, vol. 1, pp. 281-282, 1999.
3. C. Weissig, I. Feldmann, J. Schüssler, U. Höfker, P. Eisert, P. Kauff, "A Modular High-Resolution Multi-Projection System", Proc. $2^{nd}$ Workshop on Immersive Communication and Broadcast Systems, Berlin, Germany, October 2005.
4. D. Gotz, "The Design and Implementation of PixelFlex: A Reconfigurable Multi-Projector Display System", Technical Report, Univ. of North Carolina, Chapel Hill, US, 2001.
5. O. Bimber, "Multi-Projector Techniques for Real-Time Visualizations in Everyday Environments", Proc. IEEE Virtual Reality Conference, Workshop on Emerging Display Technologies, 2006.
6. E. Lantz, "A Survey of Large-Scale Immersive Displays", Proc. Emerging Display Technology Conference, ACM SIGGRAPH, 2007.
7. Fraunhofer IFF, "The Elbe Dome: Immerse in Virtual Worlds", VDTC 2011, www.vdtc.de/allg/elbe-dom-eng-fraunhofer-iff.pdf
8. HPC Market Watch, "Seattle Cinerama Grand Reopening, 2011, http://markets.hpcwire.com/taborcomm.hpcwire/news/read?GUID=15456683&Cha nnelID=3197
9. Fraunhofer HHI, "Official Opening of the HHI TiME Lab", Symposium Tomorrow's Cinema—The Future of Content, February 2010, www.hhi.fraunhofer.de/en/events/trade-fairs-and-events-archive/official-opening-of-the-hhi-time-lab/time_ov/official-opening-of-the-hhi-time-lab/10.
10. U. Iwerks, "Panoramic Motion Picture Camera Arrangement", Canadian Patent Publication, no. CA 673633, 1963.
11. A. Majumder, M. Gopi, B. Seales, H. Fuchs, "Immersive teleconferencing: A new algorithm to generate seamless panoramic video imagery", Proc. of the $7^{th}$ ACM International Conference on Multimedia, pp. 169-178, 1999.
12. D. W. Rees, "Panoramic television viewing system", U.S. Pat. No. 3,505,465, April 1970.
13. S. Baker, S. Nayar, "A theory of single-viewpoint catadioptric image formation" Int. Journal of Computer Vision, 35:175-196, 1999.
14. MegaVision, "The Mega Vision System Overview", October 2004, http://www.megavision co.jp/eng/solution/index.html
15. Point Grey, "Spherical Vision", http://www.ptgrey.com
16. Carmagus, "Endzone", www.camargus.com/maxx-zoom.html 17. Journal Sentinel, "ESPN offers a closer view with Maxx Zoom technology", www.jsonline.com/sports/103677489.html
18. Immersive Media, "Dodeca 2360 Camera System", www.immersivemedia.com/products/capture.shtml
19. Full View, "FC-1005 Camera & FC-110 Camera", www.fullview.com/products.html
20. Remote Reality, "OmniAlert360", www.remotereality.com/omnialert360-productsmenu-121
21. iMovie Inc, "GeoView-3000-LB3", www.imoveinc.com/geoview.php
22. P. Sturm, S. Ramalingam, J.-P. Tardif, S. Gasparini, J. Barreto, "Camera Models and Fundamental Concepts Used in Geometric Computer Vision", Foundations and Trends in Computer Graphics and Vision, vol. 6, no 1-2, pp. 1-183, 2010.
23. K. A. Tan, H. Hua, N. Ahuja, "Multiview Panoramic Cameras Using Mirror Pyramids", Trans. on Pattern Analysis and Machine Intelligence, Vol. 26, no7, pp. 941-946, 2004.
24. S. Peleg, M. Ben-Ezra, Y. Pritch, "Omnistereo: panoramic stereo imaging", IEEE Transactions on Pattern Analysis and Machine Intelligence, Vol. 23, No. 3, pp. 279-290, March 2001.
25. H.-Y. Shum, L.-W. He, "Rendering with Concentric Mosaics", Proc. SIGGRAPH 99, ACM, Los Angeles 99.
26. J-H. Chai, X. Tong, S.-C. Chan, H.-Y. Shum, "Plenoptic Sampling", Proc. SIGGRAPH 99, ACM, New Orleans 2000.
27. H.-J. Schüssler, C. Weissig, P. Kauff, P. Eisert, "3D OmniCam", US Provisional Application No. 61/473,595, April 2011.

The invention claimed is:

1. An apparatus for capturing panoramic or semi-panoramic 3D scenes, the apparatus comprising:
   a mirror comprising a mirror surface composed of mirror plane surfaces, arranged like sides of a pyramid or clipped-pyramid with a polygonal base and an axis;
   a plurality of camera pairs each of which is associated with a respective one of the mirror plane surfaces and directed towards the respective associated mirror plane surface, so that the plurality of camera pairs look into substantially radial directions via the respective associated mirror plane surface,
   wherein, for each camera pair, virtual positions of pivot points of the cameras of the respective camera pair are offset from each other along a straight baseline which is offset from the axis, and
   a distance between virtual points of a left-hand channel camera of a first camera pair associated with a first mirror plane surface and a right-hand channel camera of a second camera pair associated with a second mirror plane surface positioned neighboring the first mirror plane surface deviates from a length of the baselines of the camera pairs by less than 10% of the length of the baselines,
   wherein center points of the baselines of all stereo camera pairs lie on a circle with radius d around axis within a deviation of 10% of d, and the length of the baselines varies within 10% of a mean baseline length B with $$d = -\frac{B}{2}\frac{\sin(\alpha)}{(1-\cos(\alpha))} + \frac{B}{2}\sqrt{\frac{2}{1-\cos(\alpha)}}$$

wherein α is the angular aperture of the mirror plane surfaces.

2. The apparatus according to claim 1, wherein the length of the baselines is a mean baseline length of the baselines the lengths of which vary within 10% of the mean baseline length.

3. The apparatus according to claim 1, wherein, for each camera pair, the virtual points of the pivot points of the cameras of the respective camera pair are positioned symmetrically left and right to a plane spanned by a normal vector of the respective associated mirror plane surface and the axis.

4. The apparatus according to claim 1, wherein centers of the baselines lie, within a deviation of 10% of a radius d, on a circle with radius d around axis.

5. The apparatus according to claim 1, wherein the virtual points of the pivot points of the cameras lie, within a deviation of 10% of a mean distance of centers of the baselines from the axis, on a circle with radius $r=\sqrt{d^2+(B/2)^2}$, where B is the mean length of the baselines.

6. The apparatus according to claim 1, wherein the virtual points of the pivot points of the cameras lie on a common plane perpendicular to the axis.

7. The apparatus according to claim 1, wherein an overlap between fields of view of the right-hand channel camera and the left-hand channel camera of the first and second camera pairs associated with the neighboring first and second mirror plane surfaces overlap each other by 5 to 20 pixel lines in average along a direction of the pixel lines.

8. The apparatus according to claim 1, wherein the cameras of the camera pairs comprise optical axis extending substantially in parallel to the axis.

9. The apparatus according to claim 1, wherein the cameras of each camera pair are rolled in opposite directions relative to each other around their optical axes.

10. The apparatus according to claim 1, wherein the cameras of each camera pair are registered to each other such that the fields of view thereof merely partially overlap each other along a lateral angle direction around the axis.

11. The apparatus according to claim 1, wherein the cameras of each camera pair are toed-in such that optical axes of the cameras intersect each other.

12. The apparatus according to claim 1, wherein the cameras of each camera pair are toed-in such that optical axes of the cameras intersect each other at the mirror plane surface with which the respective camera pair is associated.

13. The apparatus according to claim 1, wherein the cameras of the camera pairs are arranged so as to look into the substantially radial directions via the respective associated mirror plane surface in portrait format.

14. The apparatus according to claim 1, further comprising a processor configured to derive a panoramic or semi-panoramic picture or video from outputs of the camera pairs.

15. The apparatus according to claim 1, further comprising a processor configured to stitch pictures of left-hand channel cameras of the camera pairs on the one hand and pictures of right-hand channel cameras of the camera pairs on the other hand.

16. The apparatus according to claim 15, wherein the processor is configured to stitch the pictures of left-hand channel cameras of the camera pairs on the one hand and pictures of right-hand channel cameras of the camera pairs on the other hand such that, in the resulting left-hand and right-hand stitched views, only horizontal disparities exist between the left-hand and right-hand stitched views of each triple while vertical disparities and misalignments are removed.

17. The apparatus according to claim 15, wherein the processor is configured to stitch the pictures of left-hand channel cameras of the camera pairs on the one hand and pictures of right-hand channel cameras of the camera pairs on the other hand onto cylindrical surfaces around the axis in a convergence plane lying in infinity, and to rotate the two cylindrical surfaces of the left and right stereo channel in opposite directions around axis so as to shift the convergence plane from infinity to a desired depth level.

18. A method, comprising:
using a mirror comprising a mirror surface composed of mirror plane surfaces to arrange like sides of a pyramid or clipped-pyramid with a polygonal base; and
associating each of a plurality of camera pairs with a respective one of the mirror plane surfaces and directed towards the respective associated mirror plane surface, so that the plurality of camera pairs look into substantially radial directions via the respective associated mirror plane surface;
wherein, for each camera pair, virtual positions of pivot points of the cameras of the respective camera pair are offset from each other along a straight baseline which is offset from the axis; and
wherein a distance between virtual points of a left-hand channel camera of a first camera pair associated with a first mirror plane surface and a right-hand channel camera of a second camera pair associated with a second mirror plane surface positioned neighboring the first mirror plane surface deviates from a length of the baselines of the camera pairs by less than 10% of the length of the baselines, wherein center points of the baselines of all stereo camera pairs lie on a circle with radius d around axis within a deviation of 10% of d, and the length of the baselines varies within 10% of a mean baseline length B with $$d = -\frac{B}{2}\frac{\sin(\alpha)}{(1-\cos(\alpha))} + \frac{B}{2}\sqrt{\frac{2}{1-\cos(\alpha)}}$$

wherein $\alpha$ is the angular aperture of the mirror plane surfaces.

19. The method according to claim 18, further comprising:
determining calibration data for stitching pictures of the left-hand and right-hand channel cameras, by capturing a test scenery by use of the cameras;
separately stitching subsets of pictures of the left-hand channel cameras and subsets of pictures of the right-hand channel cameras;
rectifying triples of the stitched pictures of the left-hand and right-hand cameras, overlapping each other, so that only horizontal disparities exist thereinafter, with the convergence plane being set to infinity; and
mapping the triples onto locations of a cylindrical surface using feature-based stitching under maintaining the rectification.

20. A non-transitory computer readable medium comprising program code for performing, when running on a computer, a method according to claim 19.

* * * * *